(12) United States Patent  
Bauer

(10) Patent No.: US 6,796,782 B2
(45) Date of Patent: Sep. 28, 2004

(54) DEVICE FOR INJECTION MOULDING OF PLASTICS

(75) Inventor: Michael Bauer, Linz (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 49 days.

(21) Appl. No.: 10/141,023

(22) Filed: May 7, 2002

(65) Prior Publication Data

US 2002/0168443 A1 Nov. 14, 2002

(30) Foreign Application Priority Data

May 11, 2001 (AT) ........................................ GM374/2001

(51) Int. Cl.[7] ................................................ B29C 45/77
(52) U.S. Cl. ........................ 425/149; 425/451; 425/556; 425/574
(58) Field of Search ................................ 425/574, 149, 425/451, 556

(56) References Cited

U.S. PATENT DOCUMENTS 3,752,625 A * 8/1973 Van Manen ................ 425/451
6,036,472 A * 3/2000 Boudreau et al. ........... 425/556
6,089,849 A * 7/2000 Bulgrin et al. .............. 425/149
6,432,333 B1 * 8/2002 Emoto ........................ 425/574

FOREIGN PATENT DOCUMENTS

| DE | 3911246 | 10/1990 |
| DE | 43 20 366 C2 | 12/1994 |
| DE | 198 47 298 C2 | 4/2000 |
| JP | 08318546 | 12/1996 |

* cited by examiner

Primary Examiner—Tim Heitbrink
(74) Attorney, Agent, or Firm—Notaro & Michalos PC

(57) ABSTRACT

Device for injection moulding of plastics, with a plasticizing and injection unit (3), that is provided with at least one electrical drive system (6) for turning a plasticizing screw and for injecting the plasticized plastics material between the mould halves (16), wherein the injection moulding device is provided with at least one additional drive unit that firstly moves a machine part in a linear manner, and subsequently presses it against a fixed stop, and the additional drive unit is configured as a pneumatically actuated piston-cylinder unit (8, 18, 28, 38) and the force exerted by the piston assumes different values at a given gas pressure according to the setting of the piston.

5 Claims, 5 Drawing Sheets

US 6,796,782 B2

DEVICE FOR INJECTION MOULDING OF PLASTICS

FIELD AND BACKGROUND OF THE INVENTION

The invention relates to a device for injection moulding of plastics, with a plasticizing and injection unit that is provided with at least one electrical drive system for turning a plasticizing screw and for injecting the plasticized plastics material between the mould halves, wherein the injection moulding device is provided with at least one additional drive unit that moves a machine part firstly in a linear manner and subsequently presses it against a fixed stop.

The primary advantage of such devices is in that an electrical drive system is easy to control and adjust, which is advantageous for the actual functioning of the injection moulding device, namely plasticizing and injecting of the plastics material, and lastly the manufacture of items with accurately defined characteristics.

Normally, in the case of a machine with electrical driving of the plasticizing and injection unit, all movements of machine parts are enabled by electric motors. This is based on the advantage of being able to eliminate hydraulic pumps along with the associated connecting hoses and possibilities of leakage. On the other hand, it is clear that the use of an electric motor does not represent the ideal solution for the task of firstly moving a machine part in a linear manner and subsequently pressing it against a fixed stop.

SUMMARY OF THE INVENTION

On the one hand, the invention avoids the disadvantages associated with hydraulic drive systems, and on the other hand the use of electric motors for manufacturing a non-critical value pressing force of a stationary part, in that it is provided that the additional drive unit is configured as a pneumatically actuated piston-cylinder unit, and the force exerted by the pistons assumes different values according to the setting of the pistons at a given gas pressure.

The main instance of application of the invention is the use of the pneumatic drive system provided with adjustable translation for pressing the plasticizing and injection unit against the mould halves carried by the stationary die platen. With small machines that operate with low closing pressure, it is also conceivable, however, to actuate the closing unit pneumatically, avoiding electrical and hydraulic drive systems. In any case, however, this is recommended for actuating the ejecting device and the die platen device that both operate with forces that can be achieved with commercially available pneumatic drive systems.

BRIEF DESCRIPTION OF THE DRAWINGS

The invention will be described in more detail hereinafter with reference to the drawings. In these there is shown, in FIG. 1 a side view of a first embodiment of an injection unit equipped in accordance with the invention, FIGS. 2 and 3 relate to a second embodiment, also concerning the pressing of the injection unit.

DESCRIPTION OF THE PREFERRED EMBODIMENTS

Figure 1:
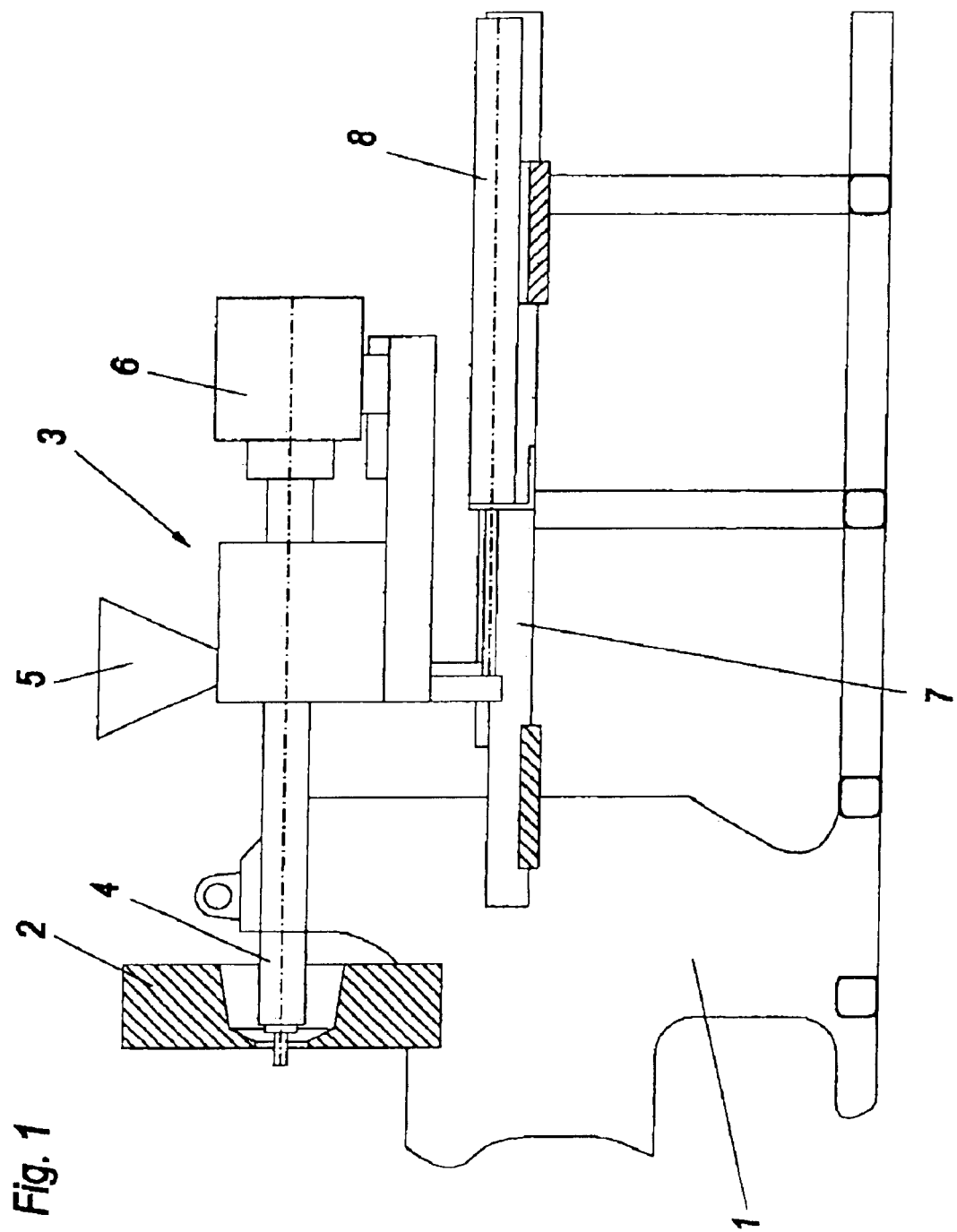

FIG. 1 shows the injection-side part of an injection moulding machine with a machine frame 1 to which a stationary die platen 2 is attached. A plasticizing and injection unit 3 is mounted movable in the horizontal direction relative to the die platen. The plasticizing and injection unit 3 includes a plasticizing cylinder 4 to which plastics material is supplied via a funnel 5, in order for it to be plasticized before injection by means of a screw arranged in the interior of the cylinder 4. Both the rotation and movement forward of the screw in the injection procedure are provided by electrical drive systems 6.

In order to move the plasticizing and injection unit 3 on the stationary framework 7 there is provided a piston-cylinder unit 8, the construction and functioning of which will be explained with reference to FIG. 6.

Figure 2:
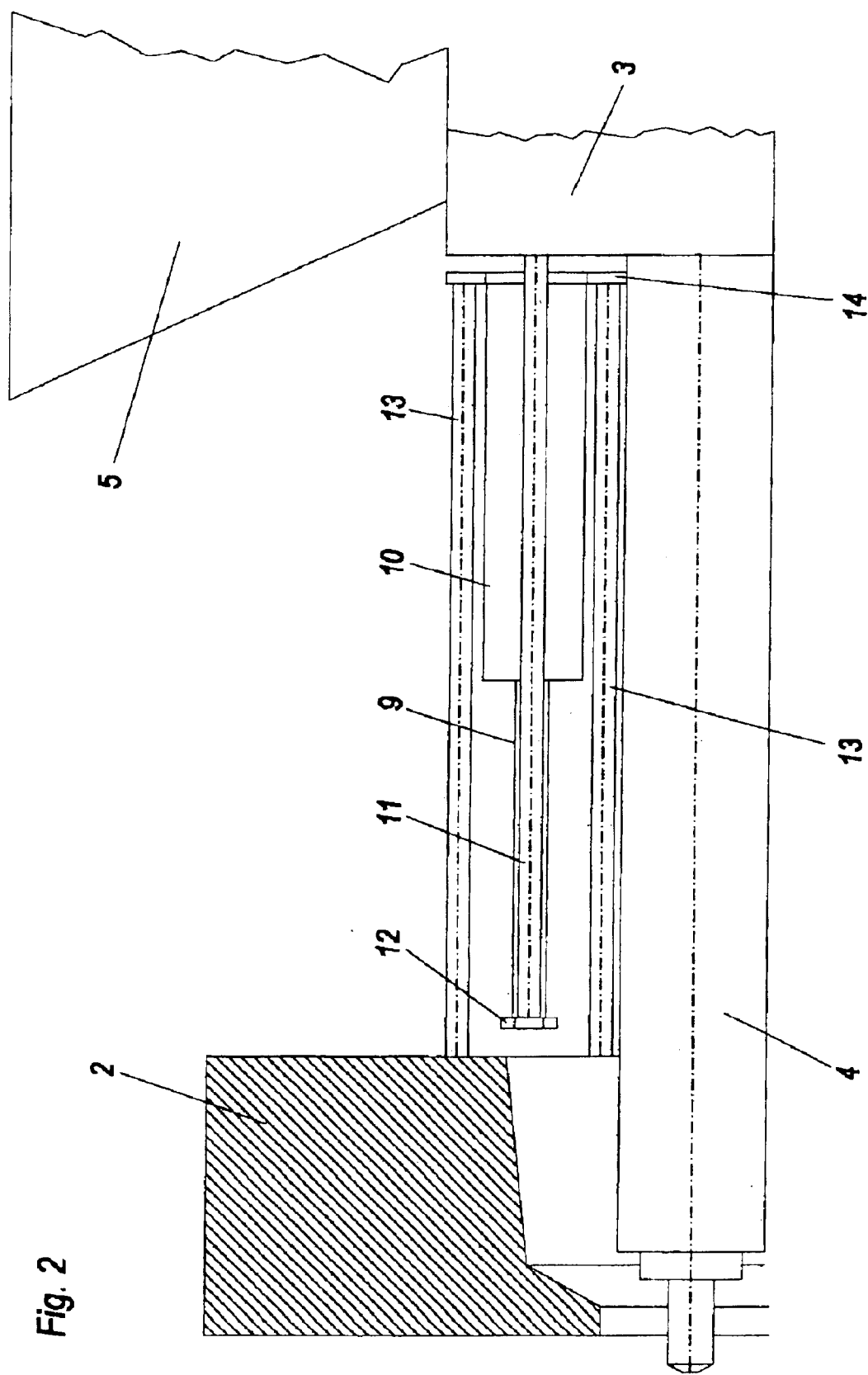
Figure 3:
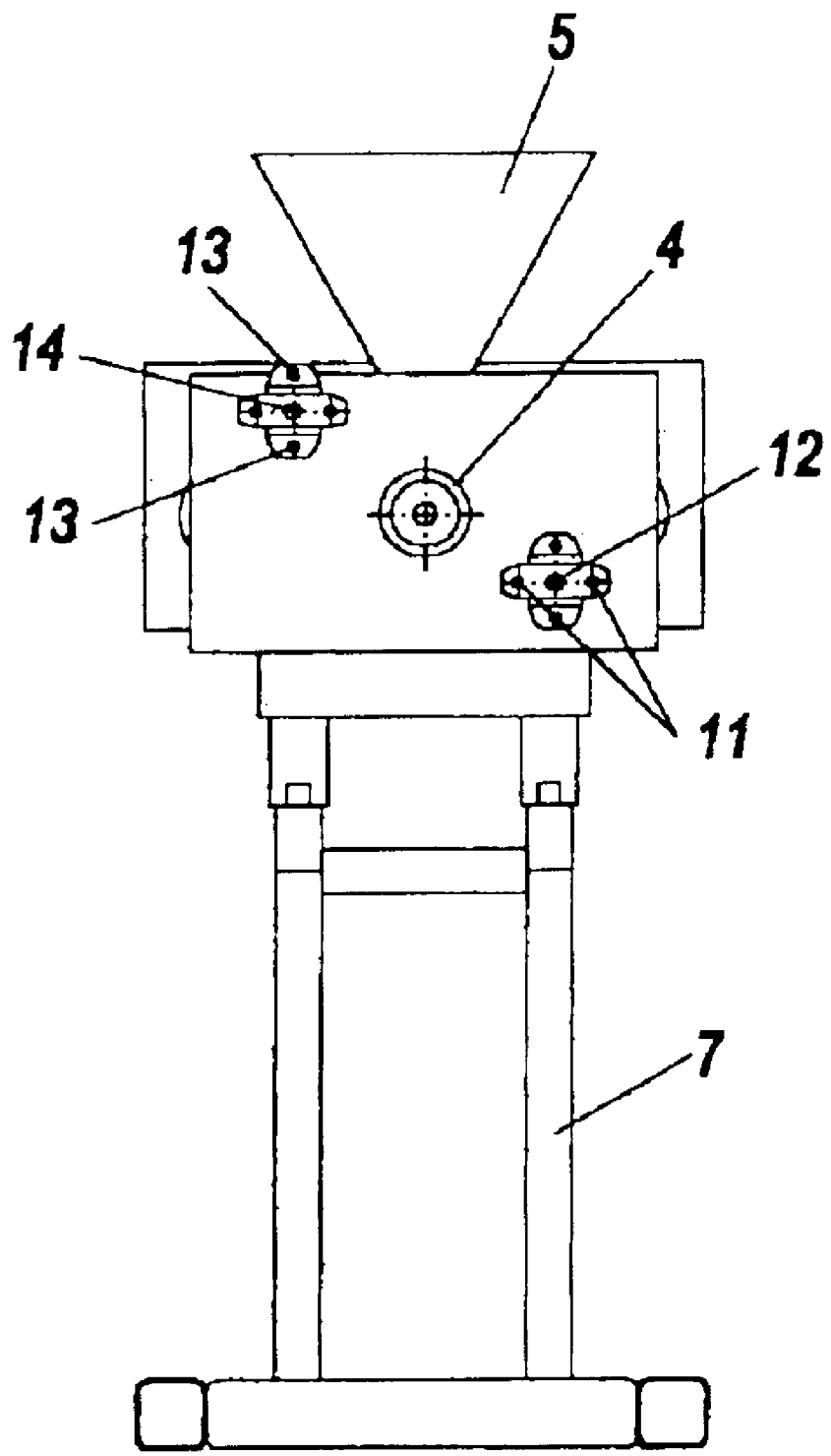

In the embodiment according to FIGS. 2 and 3, the piston-cylinder units surrounding a cylinder 10 and a piston rod 9 are not supported on the stationary framework 7, but instead on the stationary die platen 2. For this, a diversion of force is required that is provided via a horizontal bar 12 from which two rods 11 lead to the plasticizing and injection unit, and via a vertical bar 14, from which two rods 13 lead to the stationary die platen 2.

In FIG. 3 the diagonal arrangement of two such pressing units is shown.

Figure 4:
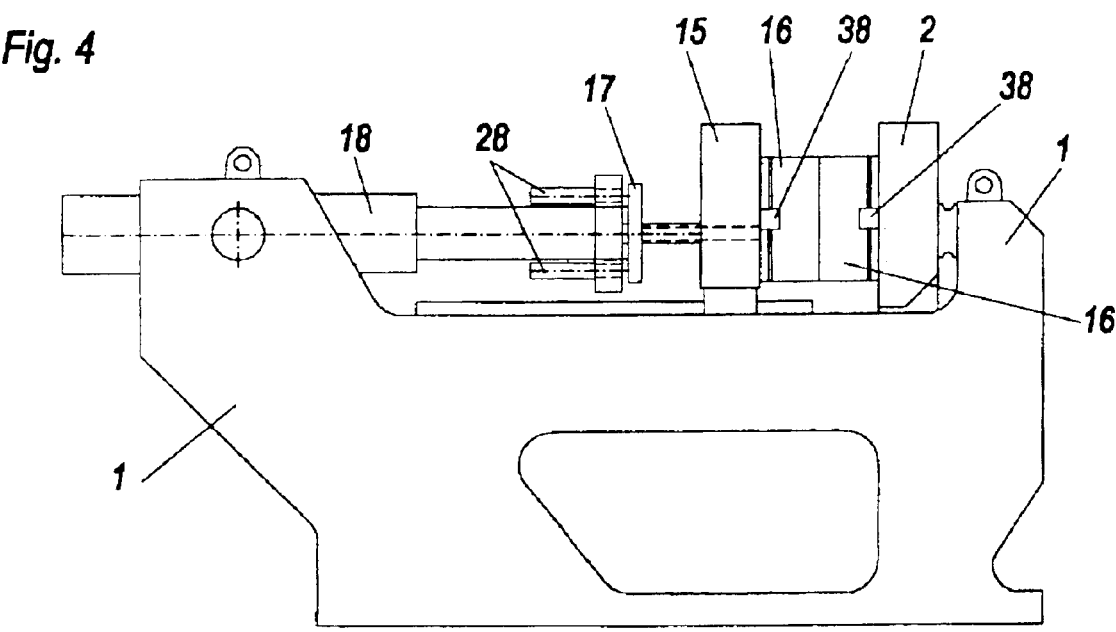
FIGS. 4 and 5 show in side view and plan view a closing unit of an injection moulding machine, configured in accordance with the invention, and FIG. 6 a commercially available construction of a pneumatic pressure translator.
Figure 5:
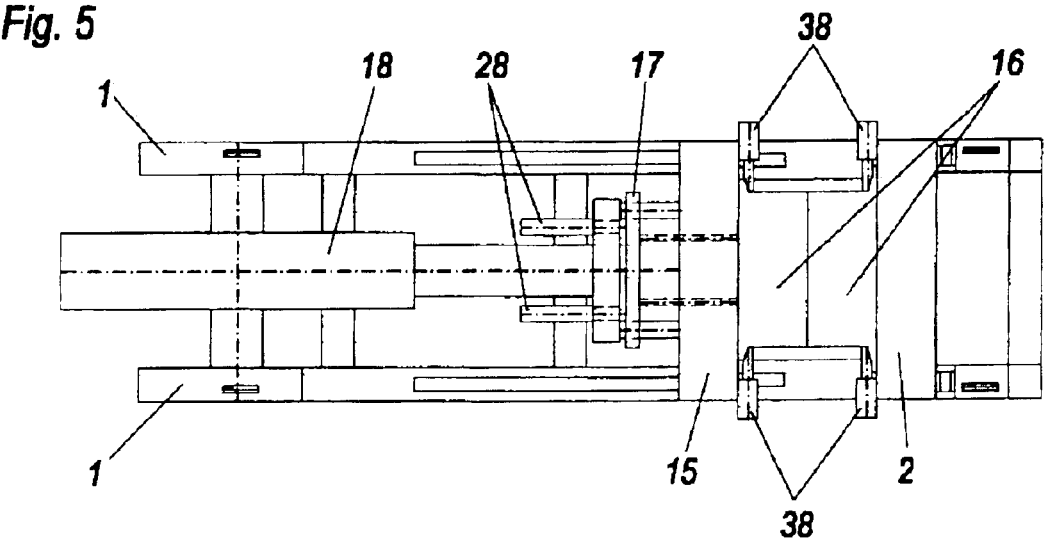

The measure according to the invention of using a pneumatic drive that can be switched between rapid and power strokes is not limited to the injection-side of the injection moulding machine. As is apparent in FIGS. 4 and 5, (exceptionally) the closing procedure by means of which the moveable die platen 15 brings together the mould halves 16 can be performed using a pneumatic piston-cylinder unit 18. It is particularly advantageous when the actuation of the ejector 17 is done using appropriate piston-cylinder units 28, above all however, in the case of the die tools 38, 38 that retain the mould halves 16 on the die platens 2 and 15, there is found an advantageous application for a pneumatic drive system with rapid and power strokes. The mould halves 16 have to be retained during the whole of the operation of the machine and it is extremely disadvantageous to do this using an electric motor that is practically always at a standstill.

Figure 6:
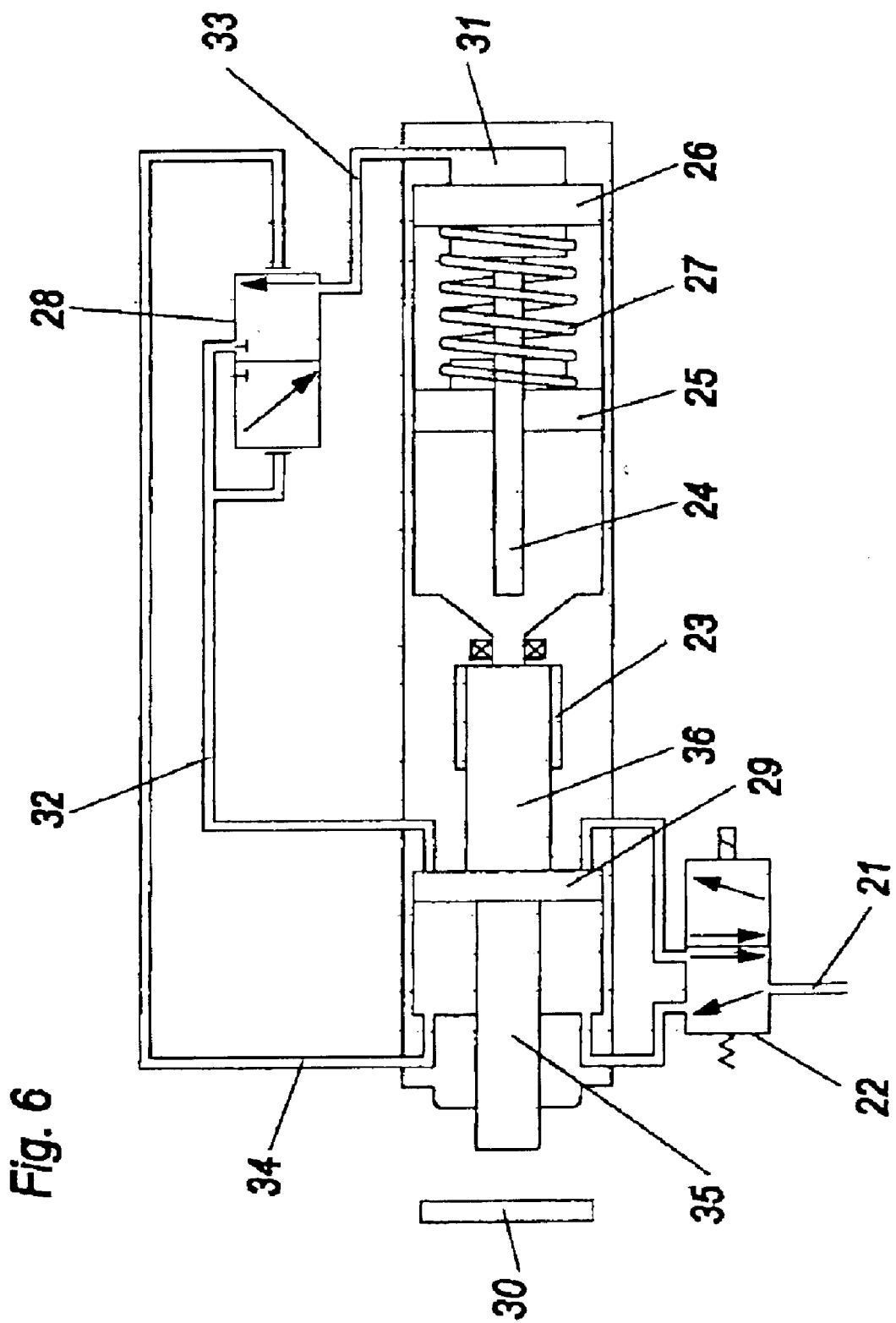

The adjustable pneumatic drives according to the invention are commercially available and in the form shown in FIG. 6 are sold under the registered mark TOX. The working piston 29 of the device shown in FIG. 6 has front and rear piston rods 35 and 36. The actuation of this working piston 29 is such that when an obstacle 30 is encountered, a rapid stroke follows, whereby pressing using a large amount of force is switched over to. For this, the device has a piston composed of two parts 25 and 26, said parts of which are connected by a spring 27, wherein the front part 25 can slide on the rod 24 fixed onto the rear part 26. The piston 25 works on the rear of the piston rod 36 by means of a liquid that is arranged in the connecting spaces 23.

The distribution of the compressed air supplied by the line 21 is done in different ways in the individual rapid stroke, power stroke and return stroke phases. In the rapid stroke, the main control valve 22 is actuated. The working piston 29 travels, as a result of the compressed air supplied in the line 32, until the front piston rod 35 encounters the obstacle or resistance 30. This resistance performs the switching on of the auxiliary valve 28 over line 34 for the power stroke. The space 31 behind the part or piston 26 undergoes an admission via the line 33 and the increased pressure in the space 23 sealed by the rod 24 is against the piston rod 36.

In order to return the device to the initial position, the auxiliary valve 28 vents the space 31 of the working piston 29 and the translating piston composed of the parts 25 and 26 returns to the original position.

Although the invention has been demonstrated with reference to the device according to FIG. 6, it is not limited thereto. It can instead be implemented using any differently translating pneumatic drive system.

What is claimed is:

1. Device for injection moulding of plastics, with a plasticizing and injection unit that is provided with at least one electrical drive system for turning a plasticizing screw and for injecting the plasticized plastics material between the mould halves, wherein the injection moulding device is provided with at least one additional drive unit that firstly moves a machine part in a linear manner during a rapid stroke and subsequently presses it against a fixed stop during a power stroke, wherein the additional drive unit is configured as a pneumatically actuated piston-cylinder unit, and at a given gas pressure the force exerted by the piston assumes a value during the rapid stroke which is different from a value exerted by the piston during the power stroke according to the setting of the piston.

2. Device according to claim 1, characterised in that the additional drive unit is at least one piston-cylinder unit (8) pressing the plasticizing and injection unit (3) against the mould halves carried by the stationary die platen (2).

3. Device according to claim 1 characterised in that the additional drive unit is a piston-cylinder unit (18) serving to generate the closing pressure between the mould halves (16) carried by the die platens (2, 15).

4. Device according to claim 1 characterised in that the additional drive unit is a piston-cylinder unit (28) for actuating an ejection device (17).

5. Device according to claim 1 characterised in that the additional drive unit is a piston-cylinder unit (38) of the die device for fixing a mould half (16) to one of the die platens (21, 15).

* * * * *